US007190745B2

(12) United States Patent
Takada et al.

(10) Patent No.: US 7,190,745 B2
(45) Date of Patent: Mar. 13, 2007

(54) RADIO-CONTROLLED TIMEPIECE, STANDARD FREQUENCY RECEPTION METHOD, AND ELECTRONIC DEVICE

(75) Inventors: Akinari Takada, Mitaka (JP); Takashi Ihara, Nishitokyo (JP); Masaaki Namekawa, Tokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 695 days.

(21) Appl. No.: 10/299,002

(22) Filed: Nov. 19, 2002

(65) Prior Publication Data

US 2003/0117901 A1 Jun. 26, 2003

(30) Foreign Application Priority Data

Nov. 20, 2001 (JP) ............................ 2001-354008
Nov. 15, 2002 (JP) ............................ 2002-332646

(51) Int. Cl.
*H04L 27/06* (2006.01)
*G04C 11/02* (2006.01)

(52) U.S. Cl. ........................................ 375/342; 368/47

(58) Field of Classification Search ................ 375/149, 375/147, 254, 284, 285, 316, 342, 346, 348, 375/350; 368/47, 48, 49, 50, 51, 52, 53, 368/54, 61

See application file for complete search history.

(56) References Cited

U.S. PATENT DOCUMENTS

| | | | | |
|---|---|---|---|---|
| 4,525,685 | A * | 6/1985 | Hesselberth et al. | 331/10 |
| 5,528,560 | A * | 6/1996 | Ogiyama | 368/47 |
| 5,668,915 | A * | 9/1997 | Baik et al. | 386/46 |
| 5,805,647 | A * | 9/1998 | Schafer et al. | 375/366 |
| 6,959,198 | B2 * | 10/2005 | Mitsugi | 455/500 |
| 2005/0105399 | A1 * | 5/2005 | Strumpf et al. | 368/47 |

FOREIGN PATENT DOCUMENTS

| | | |
|---|---|---|
| JP | 8-201546 A | 8/1996 |
| JP | 11-304973 A | 11/1999 |

* cited by examiner

*Primary Examiner*—Khanh Tran
*Assistant Examiner*—Sam K. Ahn
(74) *Attorney, Agent, or Firm*—Foley & Lardner LLP

(57) ABSTRACT

The receiver receives the standard frequency signal that includes a time code. A sampling unit samples one bit of the received signal at 32 positions. A smoothing unit smoothens the result of sampling by dividing the 32 positions in two to four intervals and determines a value of the received signal in each interval. A waveform determining unit determines waveform of each bit of the received signal based on the value obtained in the smoothing unit. The decoding unit extracts the time code based on the determined waveform. A time unit correct the time based on the extracted time code.

20 Claims, 13 Drawing Sheets

RADIO-CONTROLLED TIMEPIECE, STANDARD FREQUENCY RECEPTION METHOD, AND ELECTRONIC DEVICE

BACKGROUND OF THE INVENTION

1) Field of the Invention

The present invention relates to a radio-controlled timepiece that receives a radio signal and corrects the time based on the time information in the radio signal. This invention also relates to method of receiving the radio signal and an electronic device that includes the radio-controlled timepiece.

2) Description of the Related Art

Radio-controlled timepieces have become popular in, for example, Germany, England, America, and Japan. A wide-band carrier signal of tens of kHz is employed to transmit radio signal that contains time information to the radio-controlled timepieces. Although the carrier signal in all these countries is a wide-band signal, the pulse waveforms for 0, 1, and the like, differs in each country.

A conventional radio-controlled timepiece has been described in the Japanese Patent Laid Open Publication No. 8-201546. This radio-controlled timepiece has a radio-controlled time correction function in which it receives a wide-band standard frequency signal (i.e., a radio signal) and corrects the time based on the time code (i.e., time information) in the standard frequency signal. This time correction function is activated at a predetermined time or when instructed by the user of the timepiece. Precisely, the radio-controlled timepiece has a receiver and a time unit and, the receiver receives the standard frequency signal when it receives a reception approval signal from the time unit.

The format of the time code transmitted in the standard frequency signal in Japan (Japanese standard frequency signal) is shown in FIG. 9. The time code is transmitted at a rate of one bit per second. Moreover, time code transmitted in one minute is considered as one frame. The information about minute, hour, days elapsed from January 1st, year, and day of a week are included in one frame.

Since the minute, hour etc. are determined based on the position of 0 second, it is necessary to decide the position of 0 second. A marker P code is also included, apart from 0 and 1. The waveform of 0, 1, and P are shown in FIGS. 10 to 12, respectively. The P code appears at many instances in a single frame. For instance, the P code appears at instances of 0 second, 9th second, 19th second, 29th second, 39th second, 49th second, and 59th second. Thus, the P code appears continuously only for two times, i.e., at 59th second of one frame and at 0 second of subsequent frame. In other words, when the P code appears consecutively twice it means that a new frame has started and, it is the 0 second position. Once the position of the 0 second is detected, the waveform (0, 1, or P) of the data is determined for each bit of data received at every second.

Conventionally, the waveform is determined as follows. That is, as shown in FIGS. 10 to 12, data is sampled at the two points, $T_A$ and $T_B$, and the waveform is decided based on weather the sampled values indicate high or low. To be more specific, as shown in FIG. 10, when $T_A$ and $T_B$ are both high, it is 0 waveform. As shown in FIG. 11, when $T_A$ is high and $T_B$ is low, it is 1 waveform. As shown in FIG. 12, when $T_A$ and $T_B$ are both low, it is P waveform.

FIG. 13 shows the format of the data transmitted in the standard frequency signal in America (American standard frequency signal). The format of the data transmitted in the American and Japanese standard frequency signals is the same with regard to the items of minute, hour, days elapsed, and P code, but it is different for the item of year.

The waveforms of 0, 1, and P in the American standard frequency signal are shown in FIGS. 14 to 16. These waveforms differ from the waveforms of 0, 1, and P in the Japanese standard frequency signal. Nevertheless, in America, the determination of the waveform is performed in the same manner as in Japan, i.e., by sampling the waveform at the two points. To be more specific, as shown in FIG. 14, when $T_A$ and $T_B$ are both high, then it is 0 waveform. As shown in FIG. 15, when $T_A$ is low and $T_B$ is high, it is 1 waveform. As shown in FIG. 16, when $T_A$ and $T_B$ are both low, it is P waveform.

How the time code is extracted, after the determination of waveforms of 0, 1, and P, has been described in Japanese Patent Laid Open Publication No. 11-304973 filed by the applicant of this patent application.

In the conventional radio-controlled timepiece, the reception of the standard frequency signal is greatly affected by the electric field intensity and the signal-to-noise (S/N) ratio. The receiving unit in the radio-controlled timepiece can demodulate the radio signals and output waveforms that are substantially same as the waveforms shown in FIGS. 10 to 12 or FIGS. 14 to 16 when the electric field intensity is high and the S/N ratio is low. However, if the electric field intensity is low and the S/N ratio is high, the receiver outputs faulty waveforms. FIGS. 17 to 19 show examples of the faulty waveforms of 0, 1, and P, respectively. In FIG. 19, a reference numeral 1900 indicates spikes in the P waveform.

Although the waveform is faulty, sometimes it is not possible to decide that the waveform is faulty. To be more specific, since both the values will be low when sampling is performed at two places in the waveform shown in FIG. 18, although this waveform is the 1 waveform, it is wrongly identified as the P waveform and no error signal is output. In this case, since an error signal is not output, the reception process is continued as it is and, time is corrected based on wrong information.

In case of the waveform shown in FIG. 19, the waveform may be detected as a correct waveform or a faulty waveform depending on the sampling positions. If a faulty waveform is detected as a correct waveform, the reception process is continued as it is and, time is corrected based on wrong information. On the other hand, if a correct waveform is decided as a faulty waveform, the reception process is repeated from the beginning and, it takes time for completing the reception process. In addition, there is an unnecessary consumption of electricity when the reception process is repeated.

SUMMARY OF THE INVENTION

It is an object of the present invention to speedily, effectively, and correctly detect the waveforms even if there is an error in the demodulated code.

A radio-controlled timepiece according to one aspect of the present invention comprises, a receiving unit that receives a standard frequency signal that contains a time code and, outputs a received signal based on the received standard frequency signal, the received signal having a plurality of bits; a sampling unit that samples each bit of the received signal at predetermined sampling periods and, outputs the result of the sampling; a smoothing unit that smoothens the received signal based on result of the sampling in the sampling unit; a waveform determining unit that determines a waveform of each bit of the received signal based on the smoothened received signal; and a time determining unit that determines the time code in the received signal based on the waveform determined by the waveform determining unit.

The standard frequency reception method according to another aspect of the present invention comprises receiving a standard frequency signal that contains a time code and, outputs a received signal based on the received standard frequency signal, the received signal having a plurality of bits; sampling each bit of the received signal at predetermined sampling periods and, outputting the result of the sampling; smoothing the received signal based on result of the sampling; determining a waveform of each bit of the received signal based on the smoothened received signal; and determining the time code in the received signal based on the determined waveform.

The electronic device according to still another aspect of the present invention comprises the radio-controlled timepiece according to the present invention.

These and other objects, features and advantages of the present invention are specifically set forth in or will become apparent from the following detailed descriptions of the invention when read in conjunction with the accompanying drawings.

DETAILED DESCRIPTIONS

An embodiment of the radio-controlled timepiece, the standard frequency reception method, and the electronic device according to the present invention are explained in detail with reference to the accompanying drawings.

Construction of the Radio-Controlled Timepiece

Figure 1:
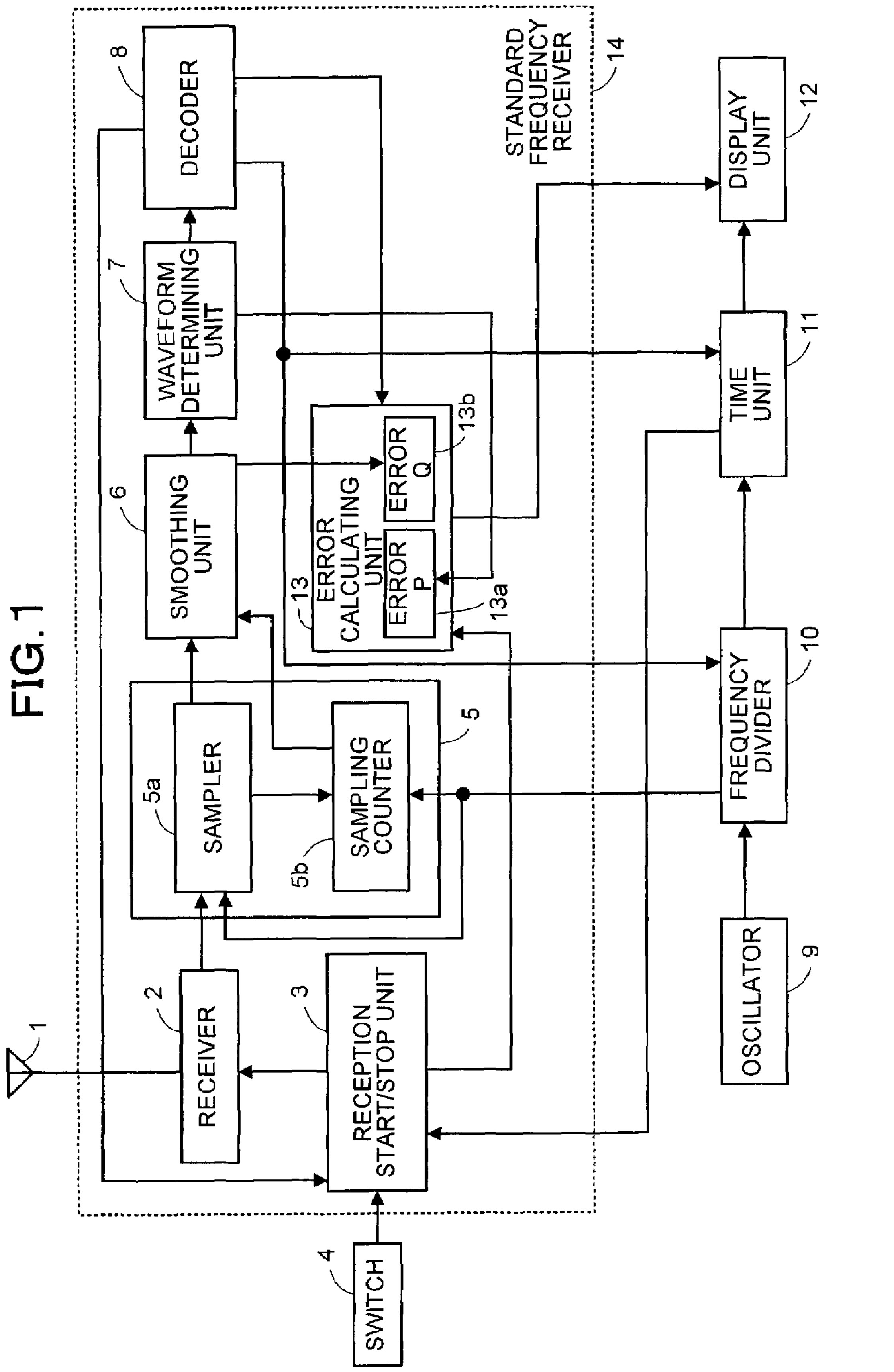
FIG. 1 is a block diagram of the construction of the radio-controlled timepiece according to an embodiment of the present invention.

First, the construction of the radio-controlled timepiece according to the embodiment of the present invention is explained. FIG. 1 shows the block diagram of the construction of the radio-controlled timepiece. A reference numeral 1 in FIG. 1 indicates an antenna that receives the standard frequency signal that includes the time code. A reference numeral 2 indicates a receiver that has filter circuits, rectifying circuits, grid detecting circuits and the like. This receiver 2 amplifies the standard frequency signal received by the antenna 1 based on a command issued by a reception start/stop unit 3 and, also performs decoding of the standard frequency signal.

The reception start/stop unit 3 controls the receiver 2 to receive the standard frequency signal at the time is decided by a time unit 11 or when a reception starting command is issued by a switch 4. The reception start/stop unit 3 clears a counter of an error calculation unit 13 when it controls the receiver 2 to receive the standard frequency signal. The reception start/stop unit 3 also enables the receiver 2 to terminate the reception of the standard frequency signal when a reception termination command is output from the time unit 11 or a decoder 8. The switch 4 is clicked when the operator desires to correct the time. When the switch 4 is clicked, a reception starting command is issued from the switch 4 to the reception start/stop unit 3.

A reference numeral 5 indicates a sampling unit that consists of a sampler 5*a* and a sampling counter 5*b*. The sampler 5*a* samples the demodulated waveform output from the receiver 2 based on a timepiece signal output from a frequency divider 10. In addition, the sampling counter 5*b* clears the counter in one second and calculates the timepiece of the frequency divider 10. The sampling counter 5*b* starts counting of the timepiece signal on receiving a count start command from the sampling counter 5*a* and clears the count after every one second.

A reference numeral 6 denotes a smoothing unit that divides the output of the sampling counter 5*a* into fixed intervals and determines whether a value in each interval is high, low or there is an error. A reference numeral 7 denotes a waveform determining unit that determines whether the waveform of the signal is 0, 1, or P based on the determination made by the smoothing unit 6. If the smoothing unit 6 determines that there is an error in the signal, the waveform determining unit 7 determines that the waveform is faulty.

A reference numeral 8 denotes a decoder that decodes each bit of the determined data that is output from the waveform determining unit 7. The decoder 8 also clears the counter of the error calculating unit 13 when the header of a frame is detected or when the head position of the frame is reached and, when the decoding is finished and, outputs the termination signal to the reception start/stop unit 3. A reference numeral 9 indicates an oscillator, 10 indicates the frequency divider, and 11 indicates the time unit. The time unit 11 performs the function of measuring the time.

The smoothing circuit 6 and the waveform detecting circuit 7 have been shown as two separate units, however, the smoothing circuit 6 and the waveform detecting circuit 7 may also be configured as a single unit. A reference numeral 12 denotes a display unit that displays time and the condition (e.g., strong, week, etc.) of the standard frequency signal. The error calculating unit 13 consists of two counters namely, an error P calculating unit 13*a* and an error Q calculating unit 13*b*.

A reference numeral 12 indicates a standard frequency receiver that consists of the receiver 2, the reception start/stop unit 3, the sampling unit 5, the smoothing unit 6, the waveform detecting unit 7, the decoder 8, and the error calculating unit 13.

Figure 2:
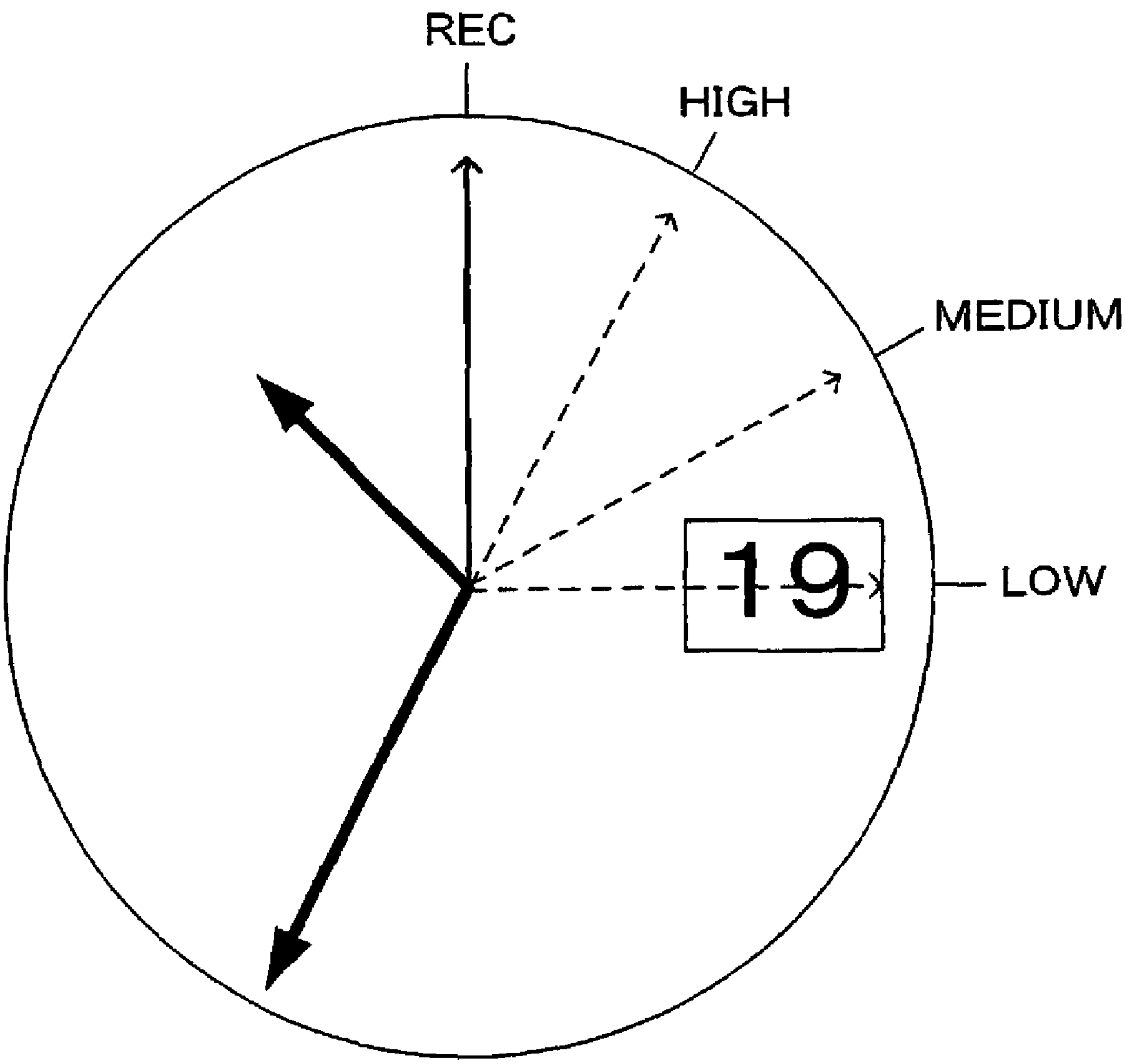
FIG. 2 is a diagram that shows an example of the contents that are displayed in the display unit of the radio-controlled timepiece according to the embodiment.

It is assumed here that a signal any one or more of high, medium, and low reception levels (see FIG. 2). The high level indicates the signal quality is good and the waveform can be detected without trouble. The medium level indicates that the signal might be erroneous and the waveform should be detected with care. The low level indicates that the signal quality is bad, that the signal is erroneous, and the waveform should be detected with care.

Figure 17:
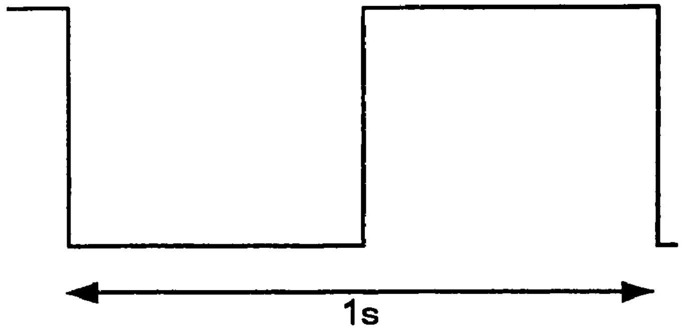
FIG. 17 PRIOR ART
FIG. 17 shows an example of a faulty waveform in the Japanese standard frequency signal.
Figure 18:
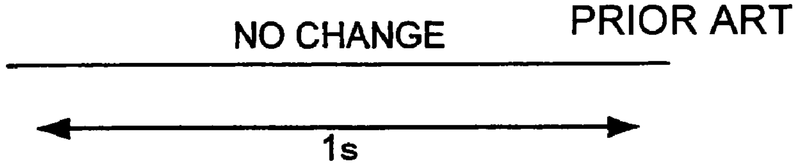
FIG. 18 PRIOR ART
FIG. 18 shows another example of a faulty waveform in the Japanese standard frequency signal.
Figure 19:
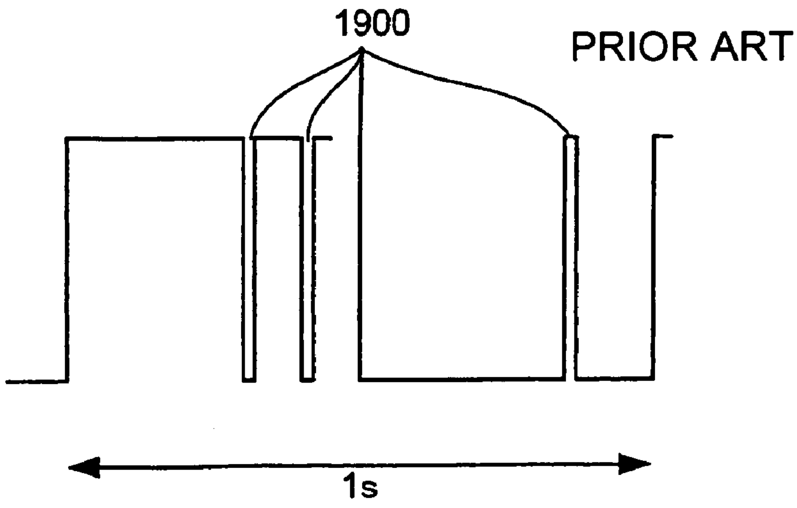
FIG. 19 PRIOR ART
FIG. 19 shows still another example of a faulty waveform in the Japanese standard frequency signal.

Moreover, it is assumed here that there could be two types of errors in waveform detection: error P and error Q. The errors P are the errors such as those shown in FIGS. 17 and 18, i.e. the waveforms that are clearly different from the true 0, 1, and P waveforms, that can be identified by the waveform determining unit 7. The errors Q are the errors such as the one shown in FIG. 19, i.e. the waveforms may or may not be identified as 0, 1, and P waveform depending on the position of sampling, that can be identified by the smoothing unit 7. The errors have been divided into the error P and error Q because the numbers of these errors vary depending on the reception condition.

Time Correction Process

Figure 3:
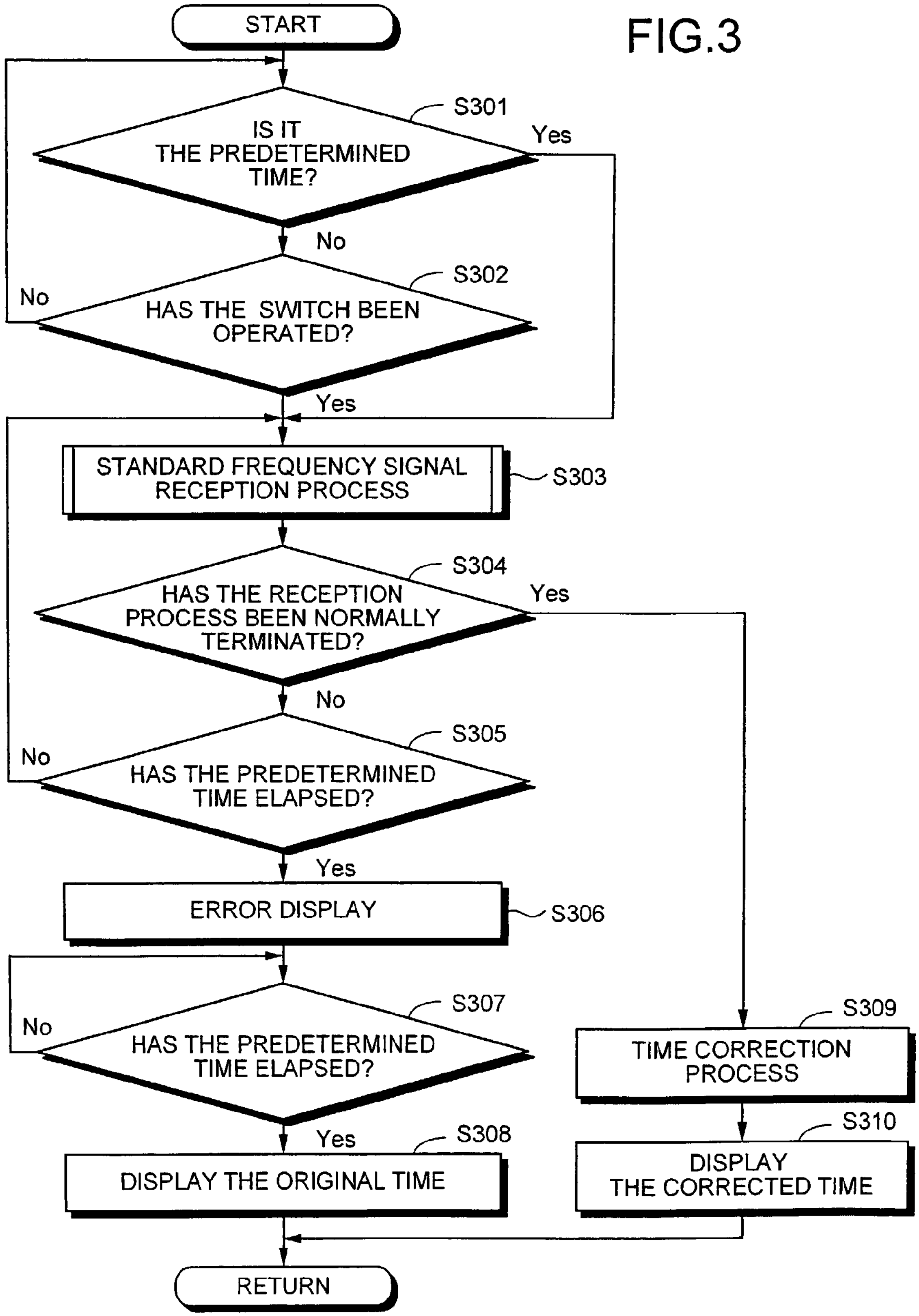
FIG. 3 is a flowchart that explains a time correction process executed by the radio-controlled timepiece according to the embodiment.

FIG. 3 is a flowchart that explains a time correction process executed by the radio-controlled timepiece. In step S301, it is determined whether it is a predetermined time. If it is not the predetermined time (No), in step S302 it is determined whether the switch 4 is operated. If the determination in step S301 indicates that it is the predetermined time (Yes), or if the determination in step S302 indicates that the switch 4 is operated (Yes), the time unit 11 or the switch 4 transmits the reception start signal to the reception start/stop unit 3. If it is not the predetermined time and if the switch 4 has not been operated, the steps S310 and S302 are repeatedly executed.

In step S303, the reception start/stop unit 3 prepares the receiver 2 to receive the standard frequency signal. At the same time, the reception start/stop unit 3 clears the counter 13*a* having the error P and clears the counter 13*b* having the error Q. During that time, as shown in FIG. 2, the seconds needle returns fast to the 00 second position, indicated as REC. The needle stops and stays at the REC position indicating that reception process is in progress. The process in the step S303 will be referred to as a standard frequency signal reception process.

In step S304, it is determined whether the standard frequency signal reception process has properly terminated. Whether the standard frequency signal reception process has properly terminated is decided, for example, based on whether determination of the time code is done properly by the decoder 8. How the time code is determined is explained later. When the reception process properly terminates (Yes), the standard frequency signal reception process is terminated. In this case, the decoder 8 transmits the reception termination command to the reception start/stop unit 3.

After the reception of the standard frequency is terminated, the decoder 8 transmits the time code, which has been properly determined, to the time unit 11. The time unit 11 then performs the time correction based on the received time code, at step S309. The display unit 12 displays the corrected time, at step S310. At this point, before displaying the corrected time, in order to display the successful reception of the radio signals, the needle moves from the REC position of 00 second to the high position (see FIG. 2). The corrected time may be displayed after a predetermined time, for example 10 seconds, has elapsed from the movement of the needle. The process ends after the corrected time is displayed.

If it is determined at step S304 that the standard frequency signal reception process has not terminated properly (No), in step S305 the time unit 11 determines whether a predetermined time, for example 10 minutes, has elapsed from the start of the reception of the standard frequency signal. If the predetermined time has not been elapsed (No), the process returns to step S303 and, the standard frequency signal reception process is performed again. If the predetermined time has elapsed (Yes), the standard frequency signal reception process is terminated. In this case, the time unit 11 transmits the reception termination command to the reception start/stop unit 3.

In step S306, the needle moves from the REC position to the medium or low position to indicate that an error has occurred. After the error is displayed, the process waits for a predetermined time, for example 10 seconds, at step S307. When the predetermined time has elapsed (Yes), the original time before the reception of the standard frequency signal starts is displayed at step S308. The entire process terminates after the display of the original time.

Standard Frequency Signal Reception Process

Figure 4:
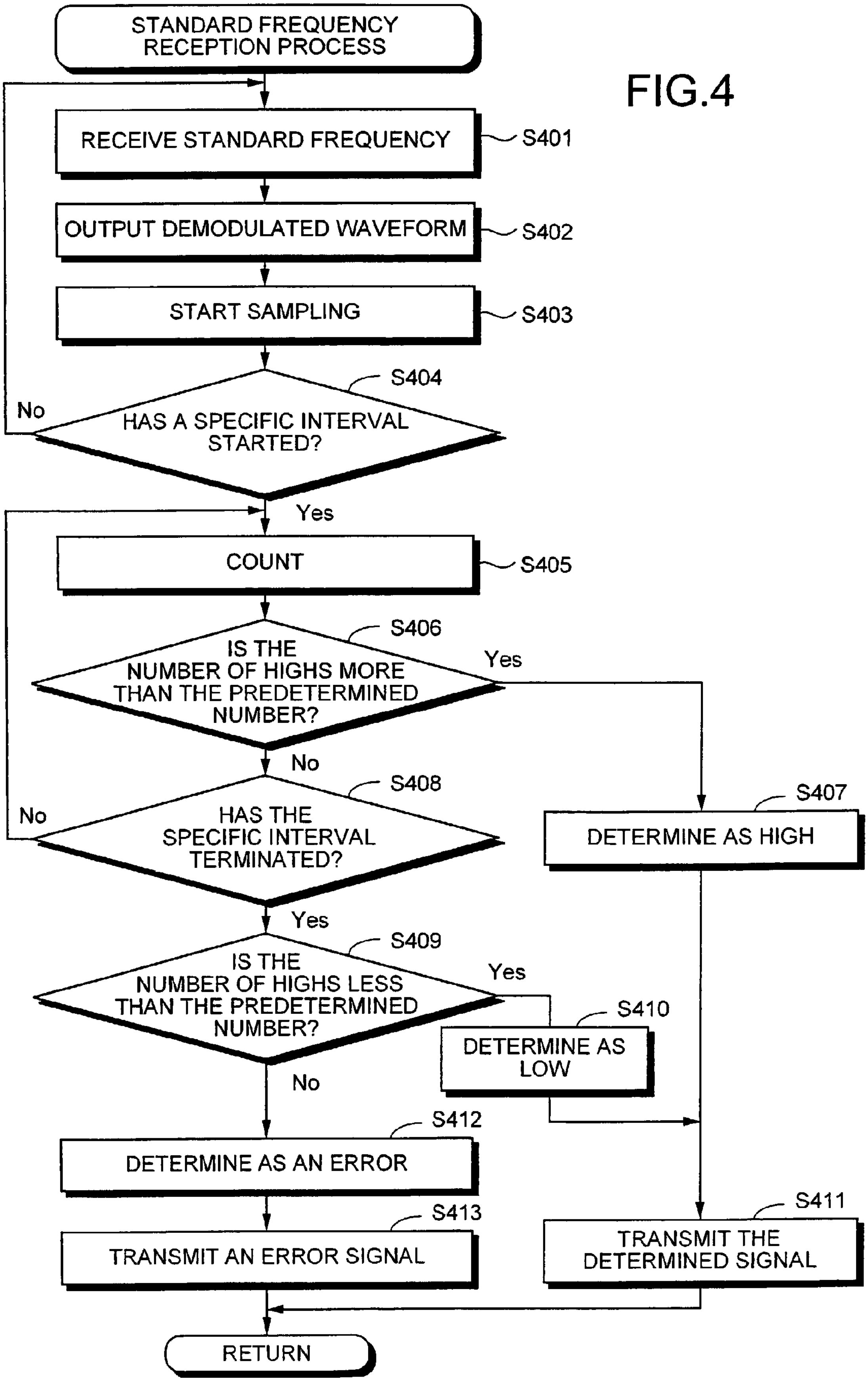
FIG. 4 is a flowchart that shows an example of a standard frequency reception process executed by the radio-controlled timepiece according to the embodiment.
Figure 5:
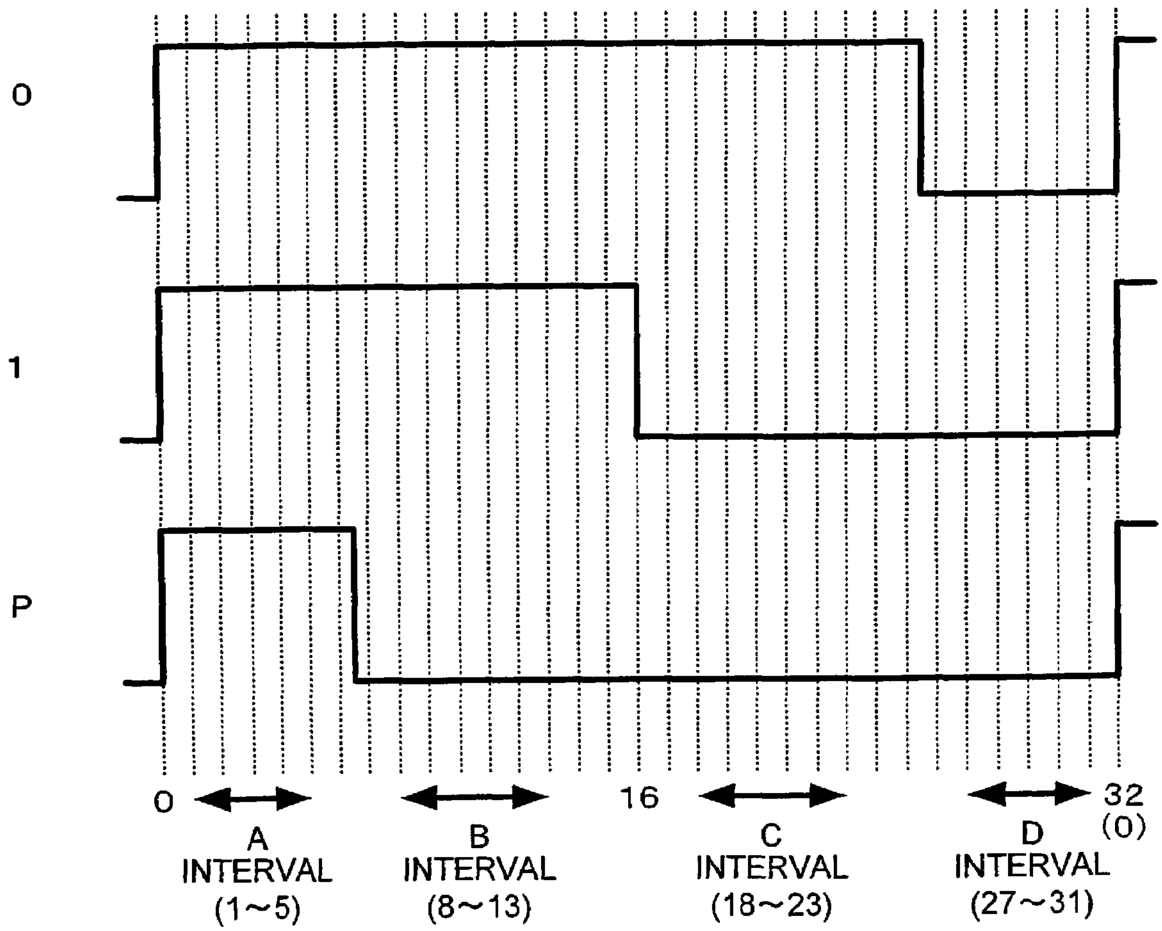
FIG. 5 is an explanatory diagram that shows the sampling of the Japanese standard frequency signal.

The standard frequency signal reception process is explained next. FIG. 4 is a flowchart that explains the standard frequency signal reception process according to the embodiment. At step S401, the antenna 1 receives the standard frequency signal. At step S402, the receiver 2 demodulates the received standard frequency signal and outputs the demodulated waveform to the sampler 5*a*. At step S403, the sampler 5*a* starts sampling of the demodulated waveform. As shown in FIG. 5, the sampler 5*a* performs the sampling in multiple predetermined cycles, i.e., 32 Hz, that is provided by the frequency divider 10. In other words, the demodulated waveform for one second is divided into 32 parts and, each part is judged for high or low.

When the sampling process is initiated, first, a rising edge of the waveform, which means a start of the waveform, is detected. If the waveform is a normal waveform, it shown a rising edge at every second. Brief explanation of how the rising edge is detected will not be provided here as detection of the rising edge is not directly linked with the present invention. When the detection of the rising edge is completed, the sampler 5*a* issues the command for initiating the count to the sampling counter 5*b*. The sampling counter 5*b* begins the count based on the 32 Hz timepiece. The sampling counter 5*b* can count up to the maximum 31 and, clears the counter when the count has reached 31. In other words, the counter is cleared after every one second.

At step S404, the smoothing unit 6 detects the output of the sampler 5*a* and, decides whether a specific interval as started. The output of the sampler 5*a* is the value of the sampling counter 5*b* that is divided into five intervals: A, B, C, and D (see FIG. 5). At step S404, the smoothing unit 6 detects whether a specific interval (e.g., interval A) has started. When the specific interval has started (Yes), at step S405 the values of signals (high, low or zero) at each 5 parts in the specific interval is counted. At step S406, it is determined whether the number of highs reaches a predetermined number, for example more than four. If the number of highs reaches the predetermined number (Yes), at step S407 it is decide that the entire specific interval has a high value. The process then proceeds to step S411.

On the other hand, when the number of highs does not reach the predetermined number (No), at step S408 it is determined whether the specific interval has terminated. When it is determined that the specific interval has terminated (Yes), at step S409 it is determined whether the number of highs is less than a predetermined number, for example two. When the number of highs is lesser than the predetermined number (Yes), at step S410 it is decided that the entire specific interval has a low value. The process then proceeds to step S411. At step S411, the smoothing unit 6 transmits the determined signal to the waveform determining unit 7.

On the other hand, when the number of highs is not less than the predetermined number (No), for example when the number of high positions is three, at step S412 it is determined that an error has occurred. At step S413 the waveform determining unit 7 transmits an error signal to the error calculating unit 13. When such an error signal is received, the error calculating unit 13 increases the counter of the error Q calculating unit 13*b* by one.

It is explained above to detect the number of highs (see steps S406 and S409) in the specific interval, but the method is not limited to this. For example, number of lows may be detected instead of the number of highs. Further, it is explained above to detect the number of highs (see step S406) after each count (see step S405) but the method is not limited to this. For example, determination of the number of highs may be performed after the count of the specific interval is over.

FIG. 4 shows the standard frequency reception process only for one specific interval (e.g., interval A). This process is repeated for the specific intervals of A to C. As shown in FIG. 5, the interval B is from the 8th to the 13th position, the interval C is from the 18th to the 23rd position, the interval D is from the 27th to 31st position. It should be noted that the positions 6, 7, and 14 to 17 are omitted from being sampled. These positions are not sampled because it can be seen from the waveforms that there are great chances that the signal is unstable at these positions. By not performing the sampling at these positions, the precision in detection of a faulty waveform is increased. Thus, it is preferable that each specific interval is separated by at least one non-sampling position.

In the 0, 1, and P waveforms, the values at sampling position of 24 and onwards will be generally low. Therefore, there is no need to detect the value at these sampling positions.

Nevertheless, the interval D is set at the sampling positions of 27 to 31. As explained above, the values at these positions should be low and there is no need to sample these positions. But, it is checked whether the values are really low at these positions to increase the precision in the detection. If a high is detected at any of these positions, it will mean that there is an error.

The determination of normal (or faulty) waveform can be performed with minimum two intervals, namely B and C. Nevertheless, a precise determination will be possible if there are three or more intervals.

Waveform Determination Process

The waveform determination process performed by the waveform determining unit 7 is explained next. The waveform determining unit 7 performs the waveform determination process based on the determination of high, low, and error positions that occur in the A, B, and C intervals. In case of the Japanese standard frequency signal, the waveform is detected as the 0 waveform when the values of the intervals A, B, and C are high, high, and high respectively, the waveform is detected as the 1 waveform when the values of the intervals A, B, and C are high, high, and low respectively, and the waveform is detected as the P waveform when the values of the intervals A, B, and C are high, low, and low respectively. When a combination of highs and lows that is different from these is detected, it means that the waveform is a faulty waveform. The waveform determining unit 7 outputs an error signal to the error P calculating unit 13*a* when a faulty waveform is detected. Moreover, the waveform determining unit 7 does not send the waveform to the decoder 8 when the faulty waveform is detected. As seen in FIG. 5, in a normal waveform (waveform without noise) the value at all the sampling positions in any one interval of the intervals A, B, and C will be either high or low. Therefore, if a combination of high and low is detected at the sampling positions in any one interval of the intervals A, B, and C, moreover, if the number of highs and lows is almost the same, the smoothing unit 6 determines that an error, for example the waveform shown in FIG. 19, has occurred and, outputs an error signal to the error Q calculating unit 13*b*.

Figure 6:
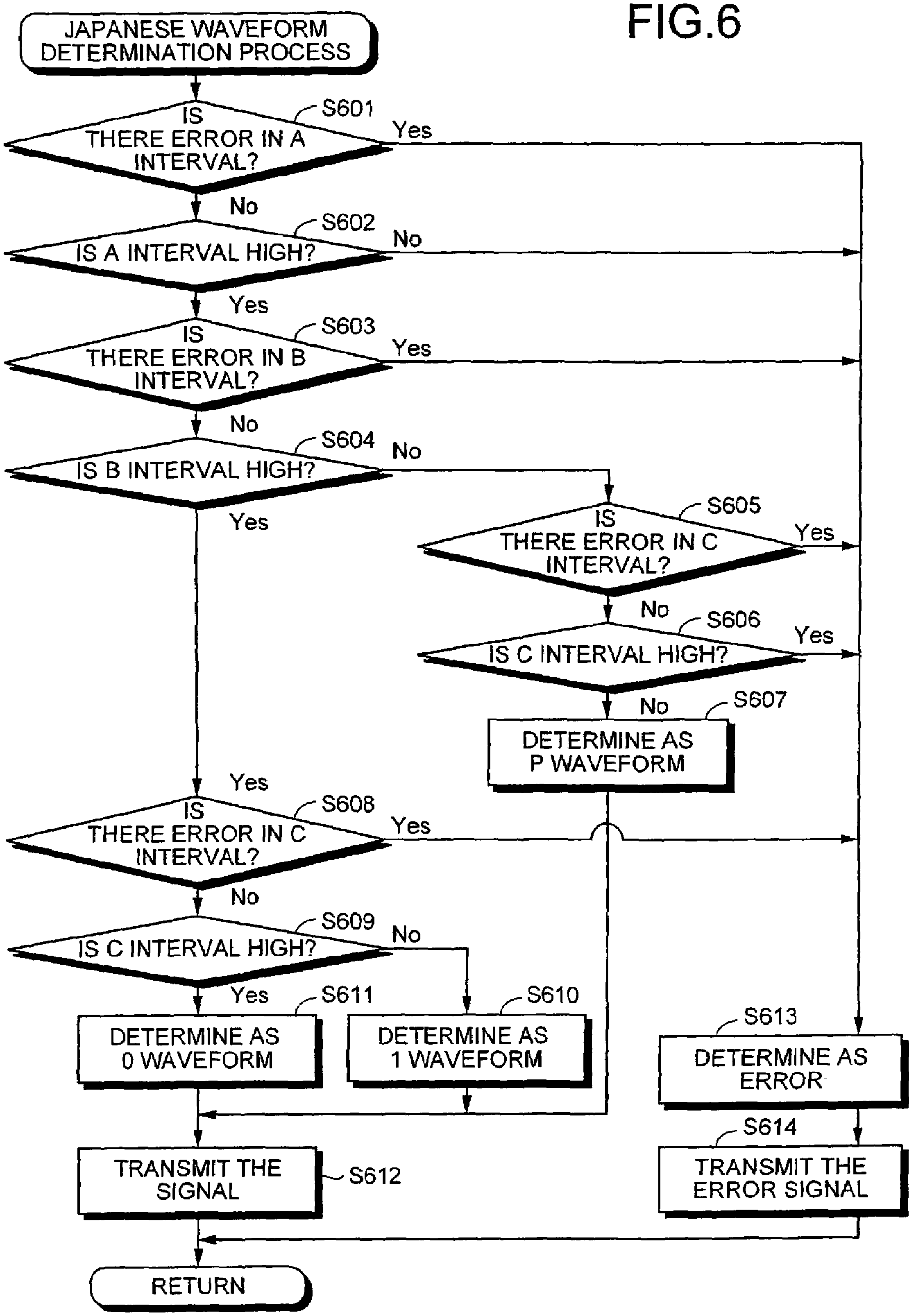
FIG. 6 is a flowchart that shows an example of the waveform determining process of the Japanese standard frequency signal executed by the radio-controlled timepiece according to the embodiment.

FIG. 6 shows a flowchart of the waveform determination process of the Japanese standard frequency signal according to the embodiment. It is determined whether errors are detected in the intervals A, B, and C (steps 601, 603, and 608). When it is determined that errors are detected in the intervals A, B, and C (Yes at steps 601, 603, and 608), the signal is considered to be an error (step S613). The waveform determining unit 7 transmits an error signal to the error P calculating unit 13*a* (step S614) and, the waveform determining process is terminated.

The value of the interval A is normally high, but if the value of the interval A is low (No at step S602), it is determined that an error has occurred (step S613). When the value of the interval A is high and the value of the interval B is low, the value of the interval C has to be high, but if the value of the interval C is low (Yes at step S606), it is determined that an error has occurred (step S613).

When the values of the intervals A, B, and C are high (Yes at step S602), high (Yes at step S604), and high (Yes at step S609) respectively, the waveform determining unit 7 determines that the waveform is the 0 waveform (step S611). When the values of the intervals A, B, and C are high (Yes at step S602), high (Yes at step S604), and low (No at step S609) respectively, the waveform determining unit 7 determines that the waveform is the 1 waveform (step S610). When the values of the intervals A, B, and C are high (Yes at step S602), low (No at step S604), and low (No at step S606) respectively, the waveform determining unit 7 determines that the waveform is the P waveform (step S607). At step S612, the waveform determining unit 7 transmits the determined waveform (0, 1, or P) to the decoder 8 and, terminates the waveform determining process. The waveform determining process is not limited to the one described in the flowchart in FIG. 6. Any other method may be used to determine the waveforms.

Figure 7:
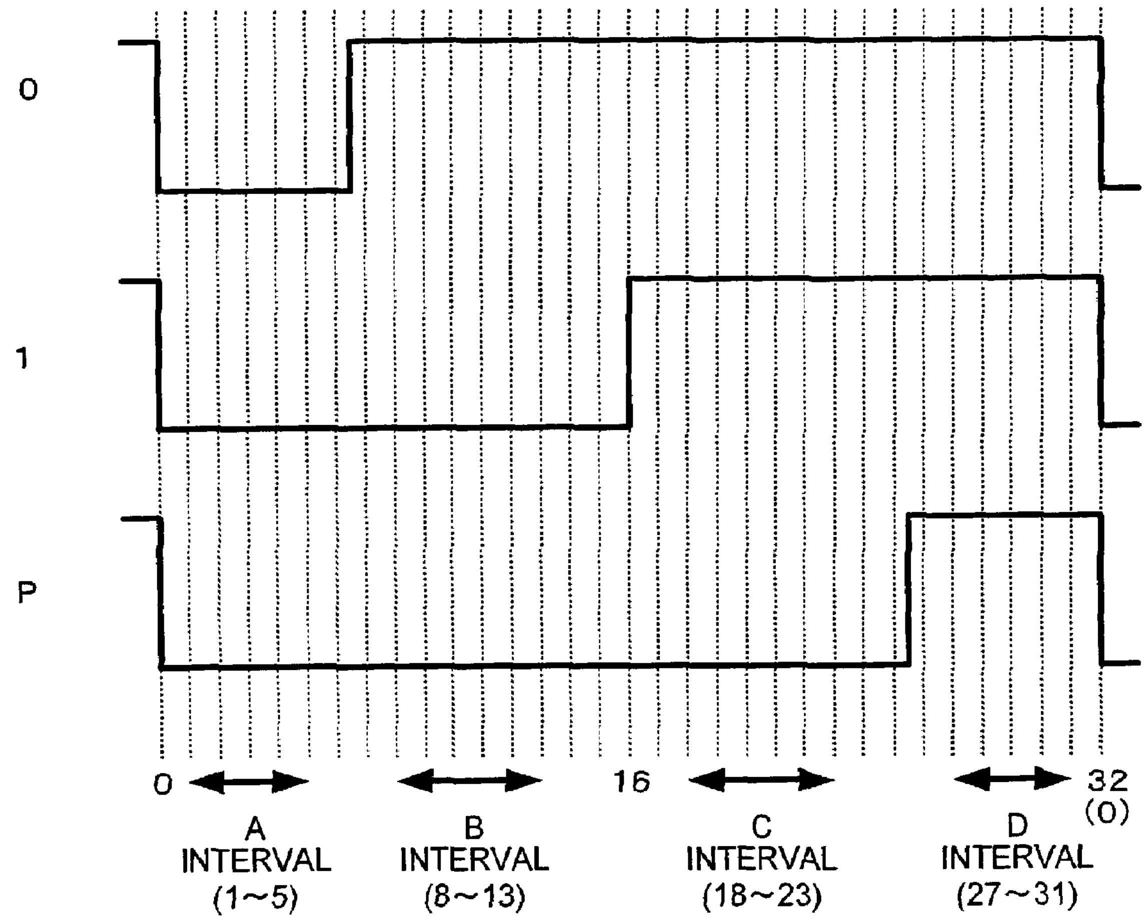
FIG. 7 is an explanatory diagram that shows the sampling of the American standard frequency signal.

FIG. 7 shows how the American standard frequency signal is sampled according to the embodiment. As shown in FIG. 7, the American standard frequency signal is sampled at four intervals: A, B, C, and D. Nevertheless, two intervals, B and C, are sufficient to determine the waveform and, the precision in the waveform detection can be increased if sampling is performed at three or more intervals.

Figure 8:
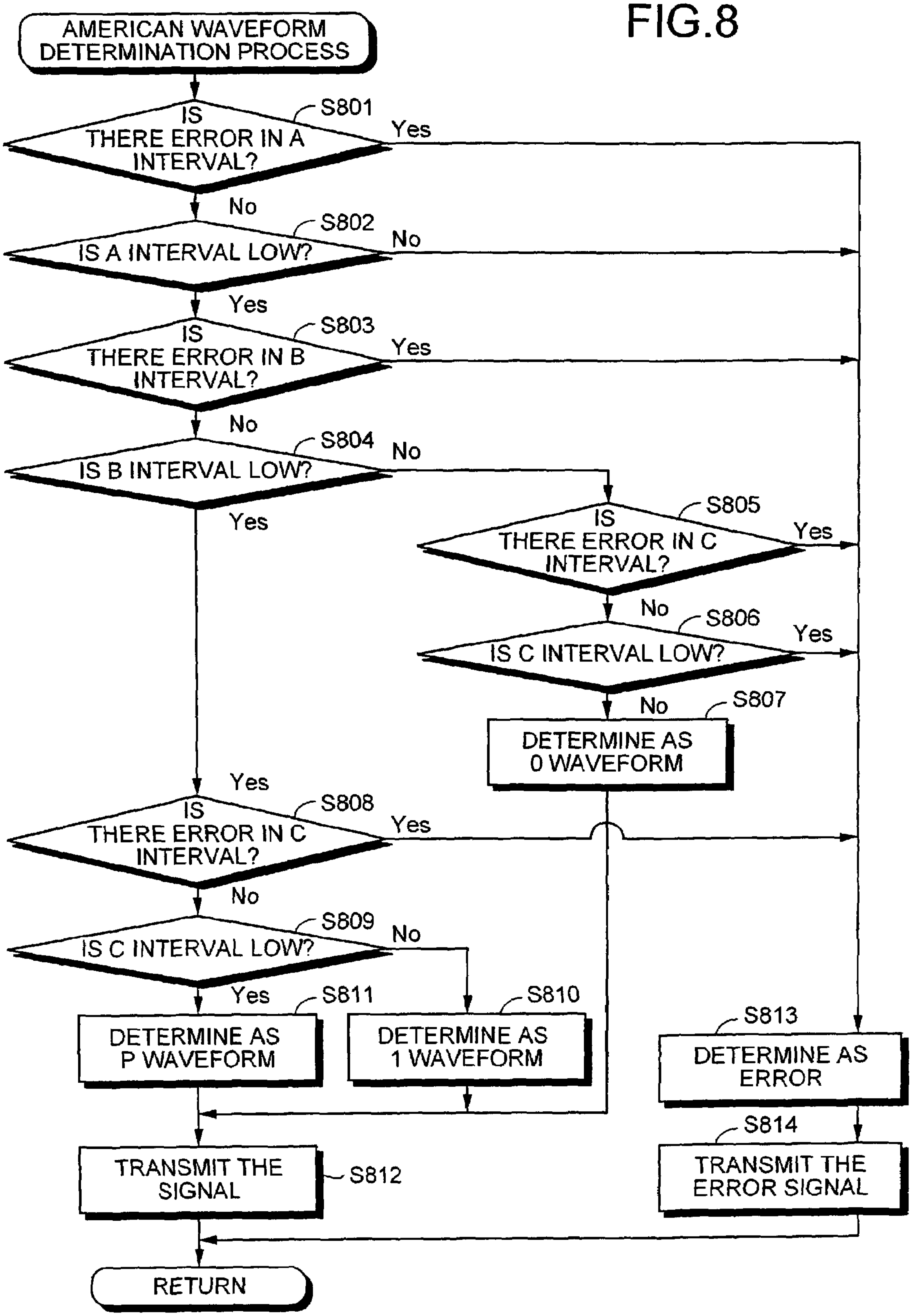
FIG. 8 is a flowchart that shows an example of the waveform determining process of the American standard frequency signal executed by the radio-controlled timepiece according to the embodiment.

FIG. 8 shows a flowchart that explains the waveform determining process of the American standard frequency signal according to the embodiment. It is determined whether errors are detected in the intervals A, B, and C (steps 801, 803, and 808). When it is determined that errors are detected in the intervals A, B, and C (Yes at steps 801, 803, and 808), the signal is considered to be an error (step S813). The waveform determining unit 7 transmits an error signal to the error P calculating unit 13*a* (step S814) and, the waveform determining process is terminated.

The value of the interval A is normally low, but if the value of the interval A is high (No at step S802), it is determined that an error has occurred (step S813). When the value of the interval A is low (Yes at step S802) and the value of the interval B is high (No at step S804), the value of the interval C has to be high at all the times, but if the value of the interval C is low (Yes at step S806), it is determined that an error has occurred (step S813).

When the values of the intervals A, B, and C are low (Yes at step S802), low (Yes at step S804), and low (Yes at step S809) respectively, the waveform determining unit 7 determines that the waveform is the P waveform (step S811). When the values of the intervals A, B, and C are low (Yes at step S802), low (Yes at step S804), and high (No at step S809) respectively, the waveform determining unit 7 determines that the waveform is the 1 waveform (step S810). When the values of the intervals A, B, and C are low (Yes at step S802), high (No at step S804), and high (No at step S806) respectively, the waveform determining unit 7 determines that the waveform is the 0 waveform (step S807). At step S812, the waveform determining unit 7 transmits the determined waveform (0, 1, or P) to the decoder 8 and, terminates the waveform determining process. The waveform determining process is not limited to the one described in the flowchart in FIG. 8. Any other method may be used to determine the waveforms.

Display Process of the Reception Condition

There are two major objectives for displaying the reception conditions (reception level) for the user. The first objective is to inform the user about the bad reception conditions as early as possible and, this is achieved by displaying the reception conditions at the initial stages, i.e., just after the reception begins. To achieve the first objective, precisely, the user is informed about the bad reception conditions if errors are detected during first 10 seconds after the first rising edge of the first waveform is detected. In other words, the user comes to know about the bad reception conditions in less than 10 seconds from the start of the reception.

The second objective is to inform the user whether reception was done correctly and, this is achieved by displaying the changes in the conditions while the reception was being performed. To achieve the second objective, precisely, detection of error is performed for a period of minute after the detection of two P waveforms continuously. The display process that fulfills the second most important objective is described next. The method of the first objective is similar to the method of the second objective, but differs only in the threshold value in the level recognized. Hence the method of the first objective will be explained only briefly.

As explained above, when error Q is detected in the smoothing unit 6 and error P is detected in the waveform determining unit 7, the number of errors P are counted in the error P calculating unit 13*a* and the number of errors are calculated in the error Q calculating unit 13*b*. When the head of the frame is detected, the counting of the errors is started and, the decoder 18 outputs the signal that clears the counter of the error-calculating unit 13. Table 1 shows a sample table of the count value and the reception level of error P and, Table 2 shows a sample table of the count value and the reception level of error Q. The reception condition is decided based on the error value of any one of the tables 1 and 2.

TABLE 1

| | Number of errors in one minute | | |
|---|---|---|---|
| | High | Medium | Low |
| Error P | 0 | 1 to 2 | More than 3 |

TABLE

| | Number of errors in one minute | | |
|---|---|---|---|
| | High | Medium | Low |
| Error Q | 0 to 1 | 2 to 4 | More than 5 |

It is also possible to decide the reception condition based on both the errors P and Q. When both the errors P and Q are used for obtaining the reception condition, the low level is displayed with highest priority and high level is displayed with lowest priority. For example, when there are four errors P (i.e., low reception level) and three errors Q (i.e., medium reception level), the errors P are displayed with priority because of their low reception level. Further, as can be understood by the flowcharts in FIG. 6 and FIG. 8, if one error Q occurs, then there has to be obviously at least one error P. Therefore, when the error Q has occurred, the reception level can never be high. Moreover, if more than three errors Q have occurred, then there will be obviously more than three errors P. Therefore, when more than three errors Q have occurred, the reception level has to be low.

When the reception condition is bad, as shown in FIG. 2, the second needle is moved fast from the REC position to the low position of 15 seconds and stopped. In many timepieces one motor is used to move the minute and second needles, or even the hour needle. In this case, if the motor is stopped to stop the movement of the second needle intentionally (say at the low position), then the movement of the hour and the minute needles will also stop and, correct time is not displayed. To avoid this problem, the motor is operated and the second needle is made to make one rotation after elapse of every one minute based on the time counted in the time unit 11. In this case, while the motor moves the second needle it also moves the hour and the minute needles based on the time counted in the time unit 11. Thus, it becomes possible to display the current time counted by the time unit 11.

When the reception condition is bad, i.e., when the second needle is at low position, the decoder 8 clears the counter of the error-calculating unit 13 and, the detection of the reception level is performed after every one minute until the decoder 8 outputs the reception termination signal.

When the error P has occurred it means that the determination of the reception level is not properly carried out in the smoothing unit 6. Therefore, when it comes to deciding the reception level, the error P is more important than the error Q. Hence, even if one error P occurs, the reception level is determined to be medium level.

In this way, the number of bits of the received signal in which errors have occurred (i.e., error P) and number of sampling position at which errors have occurred (error Q) are counted and, the reception condition of the standard frequency is determined and displayed based on at least one of these two errors.

Time Determination Process

The time determination process by the decoder 8 is explained next. The decoder 8 determines the time based on the waveforms 0, 1, and P that are determined by the waveform determining unit 7.

Figure 9:
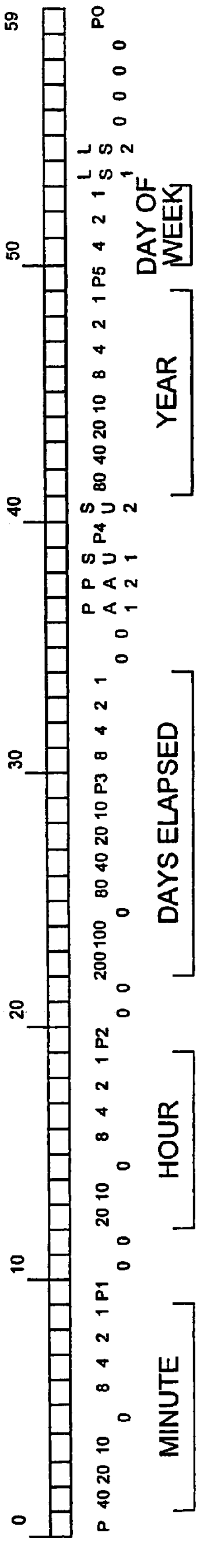
FIG.9 PRIOR ART
FIG. 9 is a diagram that shows the format of the data in the Japanese standard frequency signal.
Figure 10:
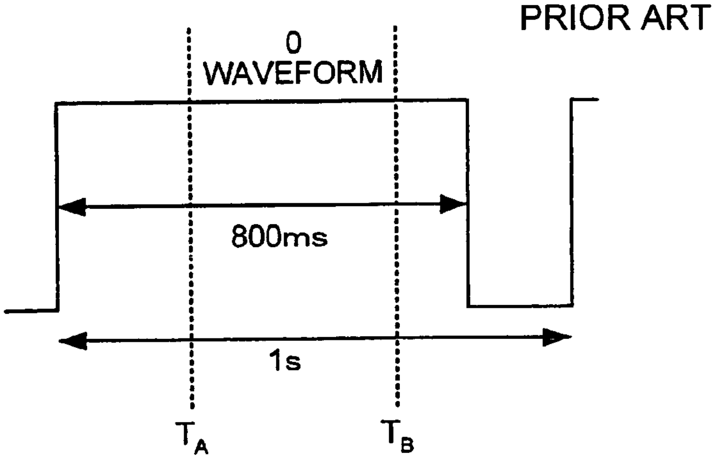
FIG.10 PRIOR ART
FIG. 10 is a diagram that shows the 0 waveform in the Japanese standard frequency signal.
Figure 11:
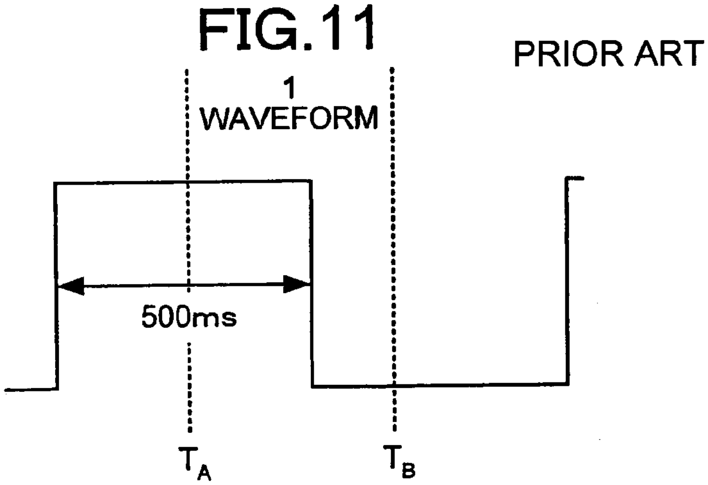
FIG.11 PRIOR ART
FIG. 11 is a diagram that shows the 1 waveform in the Japanese standard frequency signal.
Figure 12:
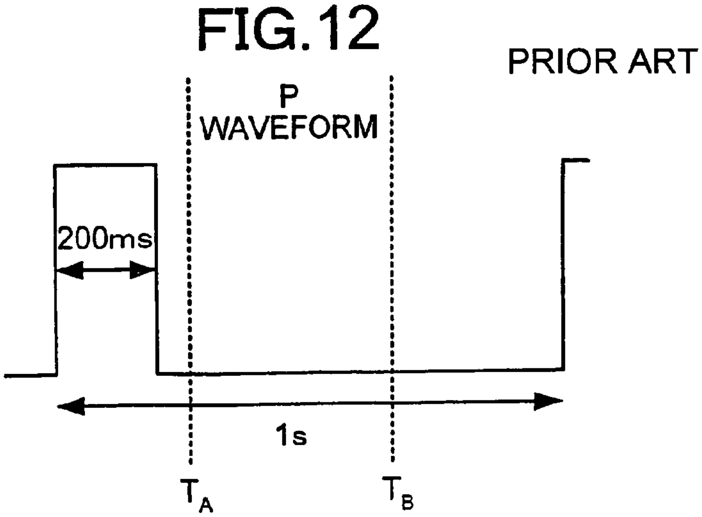
FIG.12 PRIOR ART
FIG. 12 is a diagram that shows the P waveform in the Japanese standard frequency signal.
Figure 13:
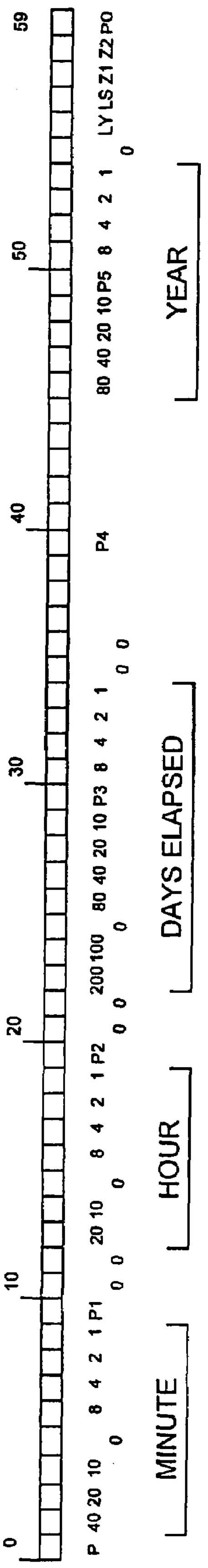
FIG.13 PRIOR ART
FIG. 13 is a diagram that shows the format of the data in the American standard frequency signal.
Figure 14:
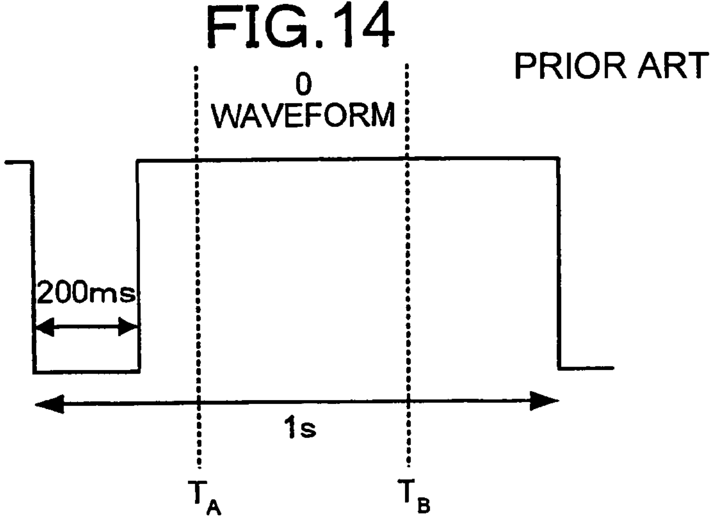
FIG.14 PRIOR ART
FIG. 14 is a diagram that shows the 0 waveform of the data in the American standard frequency signal.
Figure 15:
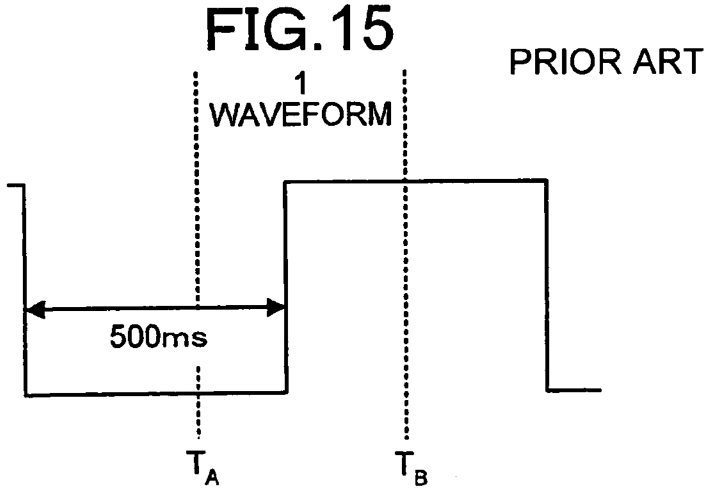
FIG.15 PRIOR ART
FIG. 15 is a diagram that shows the 1 waveform of the data in the American standard frequency signal.
Figure 16:
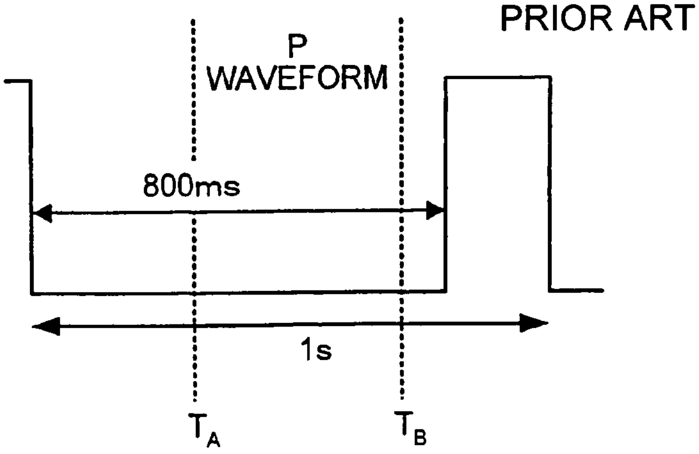
FIG.16 PRIOR ART
FIG. 16 is a diagram that shows the P waveform of the data in the American standard frequency signal.

The bit of 0 second is considered as the first bit, the bit of the first second is considered as the second bit, and likewise the bit of the fifty-ninth second is considered as the sixtieth bit. As shown in FIGS. 9 and 13, each bit corresponds to some time code. For example, the second bit indicates 40 minutes, the third bit indicates 20 minutes, the fourth bit indicates 10 minutes, the fifth bit indicates 0 minute, the sixth bit indicates 8 minutes, the seventh bit indicates 4 minutes, the eighth bit indicates 2 minutes, and the ninth bit indicates 1 minute.

For example, when 1 minute is to be indicated, out of the second to ninth bits, the fifth bit and the ninth bit will have a value of 1 (i.e., the waveform of these bits will be 1 waveform) and the remaining bits will have a value of 0 (i.e., the waveform of these bits will be 0 waveform). Similarly, when 57 minutes are to be indicated, out of the second to ninth bits, the second bit, the forth bit, the seventh bit, the eighth bit, and the ninth bit will have a value of 1 and the remaining bits will have a value of zero.

It can not happen, for example, that the values of the second bit (40 seconds) and the third bit (20 seconds) are 1 at the same time. This is because there are minutes from 0 to 59 only and there is no 60 or more minutes. If a combination of values that logically can not occur is detected, the decoder 8 detects an error signal.

After the time code has been extracted from the received signal, the decoder 8 outputs the extracted time code to the time unit 11 and, the time unit 11 updates the current time based on the received time code. Simultaneously, the counter of the frequency divider 10 is reset based on the seconds in the time code. Moreover, the hour, minute, and second needles are moved to appropriate positions rapidly to display the time based on the received time code.

On the other hand, when there is a failure in the extraction of time data, the needles are moved to appropriate positions based on time counted in the time unit 11. Moreover, the decoder 8 sends the reception terminating signal to the reception start/stop unit 3 and, the reception of the standard frequency signal is terminated. Simultaneously, the operation of the standard frequency reception unit 14 is terminated.

According to the radio-controlled timepiece of the embodiment, since the smoothing of the waveform is performed in the smoothing unit 6 based on the counts in the sampling unit 5, the correct waveforms can be detected reliably even if the waveform has minor errors. In this way, it is possible to improve the efficiency of the time correction process and, therefore, save energy consumption.

The radio-controlled timepiece according to embodiment may be used in the wrist watches, hanging timepieced, mantelpiece timepieces and the like. The radio-controlled timepiece may also be used in mobile devices such as the mobile phones, PDA's (Personal Digital Assistant), personal computers and the like. In addition, the radio-controlled timepiece may also be used in home appliances and electronic devices used in cars.

The present invention provides the radio-controlled timepiece that has following effects. That is, the radio-controlled timepiece can extract the time code from the standard frequency signal even if there are fluctuations in the standard frequency signal. Moreover, the radio-controlled timepiece can extract the time code from the standard frequency signal speedily, reliably, and effectively. Since the electronic device according to the present invention includes the radio-controlled timepiece according to the present invention, the electronic device also produces the same effects.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio-controlled timepiece comprising:

a receiving unit that receives a standard frequency signal representing current date and time, and outputs a received signal corresponding to one code;

a sampling unit that samples the received signal at predetermined time intervals, and outputs a plurality of samples each of which is taken from each of the time intervals;

a smoothing unit that smoothens the received signal based on the samples;

a first determining unit that determines the code based on the smoothened received signal; and a second determining unit that determines the current date and time based on the code, wherein the sampling unit includes a sampler that samples the received signal at the predetermined time intervals, and that issues a command for initiating a count; and a sampling counter that commences a count of a number of samples made by the sampler after the command for initiating a count has been issued by the sampler, and that clears the count when the count reaches a predetermined value, and wherein the smoothing unit smoothens the received signal by determining, for each of a plurality of specific intervals each of which including a plurality of consecutive time intervals, whether a level of the received signal is high or low.

2. The radio-controlled timepiece according to claim 1, further comprising a time unit that counts time, wherein the time counted by the time unit is corrected based on the current date and time determined by the second determining unit.

3. The radio-controlled timepiece according to claim 2, wherein the second determining unit determines whether the code determined by the first determining unit is an error, and the time counted by the time unit is not corrected if the second determining unit determines that the code is an error.

4. The radio-controlled timepiece according to claim 2, further comprising a reception starting unit that orchestrates the receiving unit to receive the standard frequency signal when the time counted in the time unit has reached a predetermined time or when an instruction is received from an operator.

5. The radio-controlled timepiece according to claim 4, wherein the reception starting unit orchestrates the receiving unit to retry the reception of the standard frequency signal when the second determining unit has failed to determine the current date and time.

6. The radio-controlled timepiece according to claim 4, wherein the reception starting unit orchestrates the receiving unit to stop the reception of the standard frequency signal when the predetermined time has elapsed.

7. The radio-controlled timepiece according to claim 1, wherein the smoothing unit determines whether the level of the received signal is high or low based on a ratio of a first number and a second number in each of the specific intervals, the first number being a number of time intervals in which the level of the received signal is high, the second number being a number of time intervals in which the level of the received signal is low.

8. The radio-controlled timepiece according to claim 1, wherein the smoothing unit determines whether the level is high or low for two specific intervals.

9. The radio-controlled timepiece according to claim 1, wherein the smoothing unit determines whether the level is high or low for three specific intervals.

10. The radio-controlled timepiece according to claim 1, wherein the smoothing unit determines whether the level is high or low for four specific intervals.

11. The radio-controlled timepiece according to claim 1, wherein no two specific intervals are consecutive.

12. The radio-controlled timepiece according to claim 1, further comprising a reception condition determining unit that counts a first number of time intervals for which the level of the received signal is not determined by the smoothing unit and a second number of time intervals for which an erroneous code is determined by the first determining unit, and determines a reception condition of the standard frequency signal based on any one of the first number and the second number.

13. The radio-controlled timepiece according to claim 12, further comprising a display unit that displays the reception condition of the standard frequency signal that is determined by the reception condition determining unit.

14. The radio-controlled timepiece according to claim 1, wherein the second determining unit determines whether the code determined by the first determining unit is an error.

15. The radio-controlled timepiece according to claim 1, wherein the first determining unit determines the code in the received signal based on a number of high signal level and low signal level occurrences within each of a plurality of consecutive intervals that are provided within a time period starting when the count equals zero and ending when the count equals the predetermined value.

16. A standard frequency reception method comprising:

receiving a standard frequency signal representing current date and time and outputting a received signal corresponding to one code;

sampling the received signal at predetermined time intervals and outputting a plurality of samples each of which is taken from each of the time intervals;

smoothing the received signal based on the samples;

determining the code based on the smoothened received signal; and determining the current date and time based on the code, wherein the sampling step includes sampling the received signal at the predetermined time intervals, and issuing a command for initiating a count: and commencing a count of a number of samples made by the sampling step after the command for initiating a count has been issued by the sampling step. and clearing the count when the count reaches a predetermined value, and wherein the smoothing includes smoothing the received signal by determining, for each of a plurality of specific intervals each of which including a plurality of consecutive time intervals, whether a level of the received signal is high or low.

17. The standard frequency reception method according to claim 16, wherein whether the level of the received signal is high or low is determined based on a ratio of a first number and a second number in each of the specific intervals, the first number being a number of time intervals in which the level of the received signal is high, the second number being a number of time intervals in which the level of the received signal is low.

18. The method according to claim 16, wherein the first determining step determines the code in the received signal based on a number of high signal level and low signal level occurrences within each of a plurality of consecutive intervals that are provided within a time period starting when the count equals zero and ending when the count equals the predetermined value.

19. An electronic device comprising:

a receiving unit that receives a standard frequency signal representing current date and time, and outputs a received signal corresponding to one code;

a sampling unit that samples the received signal at predetermined time intervals, and outputs a plurality of samples each of which is taken from each of the time intervals;

a smoothing unit that smoothens the received signal based on the samples;

a first determining unit that determines the code based on the smoothened received signal; and a second determining unit that determines the current date and time based on the code, wherein the sampling unit includes:

a sampler that samples the received sianal at the predetermined time intervals, and that issues a command for initiating a count: and a sampling counter that commences a count of a number of samples made by the sampler after the command for initiating a count has been issued by the sampler, and that clears the count when the count reaches a predetermined value, and wherein the smoothing unit smoothens the received signal by determining, for each of a plurality of specific intervals each of which including a plurality of consecutive time intervals, whether a level of the received signal is high or low.

20. The electronic device according to claim 19,
wherein the first determining unit determines the code in the received signal based on a number of high signal level and low signal level occurrences within each of a plurality of consecutive intervals that are provided within a time period starting when the count equals zero and ending when the count equals the predetermined value.

* * * * *